United States Patent [19]

Sainton

[11] Patent Number: 4,992,492

[45] Date of Patent: Feb. 12, 1991

[54] PROCESS FOR PREPARING A BINDER FOR SURFACING ROADWAYS OF BITUMEN AND RECLAIMED RUBBER POWDERED BASE AND ALSO BINDER OBTAINED BY EMPLOYING THIS PROCESS

[75] Inventor: Alain Sainton, Abbeville La Riviere, France

[73] Assignee: Beugnet, Paris, France

[21] Appl. No.: 314,013

[22] Filed: Feb. 22, 1989

[51] Int. Cl.$^5$ ............................ C08L 7/00; C08L 9/00; C08L 95/00

[52] U.S. Cl. ........................................ 524/62; 524/68; 524/71

[58] Field of Search ................... 524/62, 71, 68

[56] References Cited

U.S. PATENT DOCUMENTS

| | | | |
|---|---|---|---|
| 4,068,023 | 1/1978 | Nielsen et al. | 524/62 |
| 4,085,078 | 4/1978 | McDonald | 524/62 |
| 4,166,049 | 8/1979 | Huff | 524/62 |
| 4,250,067 | 2/1981 | Bresson | 524/71 |
| 4,358,554 | 11/1982 | Yan et al. | 524/62 |

FOREIGN PATENT DOCUMENTS

| | | |
|---|---|---|
| 2567447 | 1/1986 | France . |
| 2580658 | 10/1986 | France . |

*Primary Examiner*—Allan M. Lieberman
*Attorney, Agent, or Firm*—Seidel, Gonda, Lavorgna & Monaco

[57] ABSTRACT

The invention relates to a process for producing a binder based on bitumen and rubber powder, and comprising as an additive a heavy oil and also a synthetic elastomer. The constituents of the binder are mixed intimately to obtain an initial mixture at a temperature of between 175° and 185° C.; this temperature is maintained with agitation for around two hours, then the temperature of the mixture is lowered by 15° to 20° C. and the binder thus obtained can be kept for up to 10 days without any notable change in its properties.

26 Claims, 5 Drawing Sheets

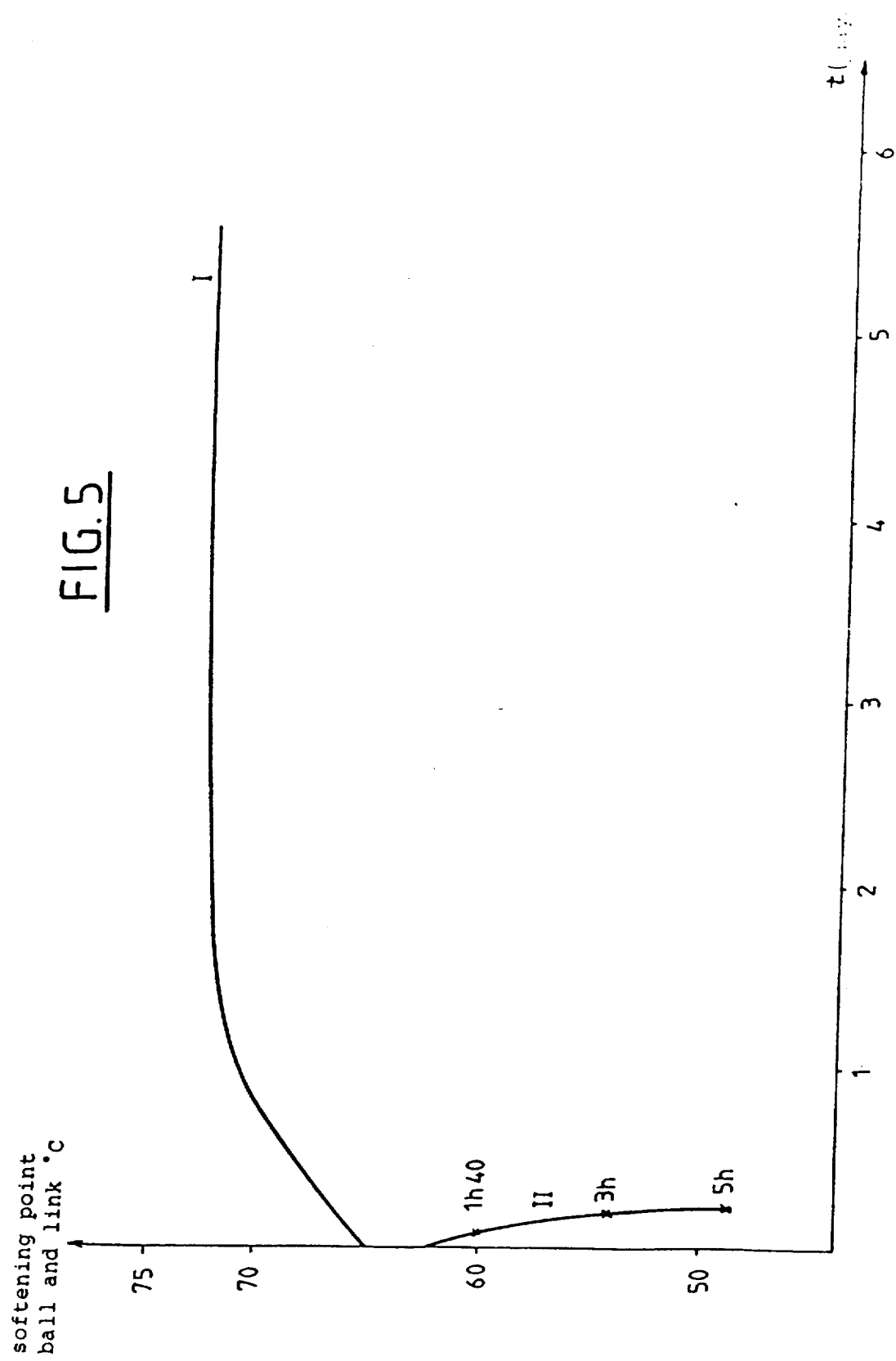

PROCESS FOR PREPARING A BINDER FOR SURFACING ROADWAYS OF BITUMEN AND RECLAIMED RUBBER POWDERED BASE AND ALSO BINDER OBTAINED BY EMPLOYING THIS PROCESS

The invention relates to a process for producing a binder based on bitumen and rubber powder, and comprising as an additive a heavy oil and also a synthetic elastomer.

This process is characterised in that the various constituents of the binder are mixed intimately so as to obtain an initial mixture at a temperature of between 175° and 185° C. this temperature is maintained with agitation for around two hours, then the temperataure of the mixture is lowered by 15° to 20° C. and the binder thus obtained can be kept for up to 10 days without any notable change in its properties.

The present invention relates to a process for preparing a binder based on bitumen or rubber powder for surfacing roadways or the like.

Such binders are currently used, particularly to produce floor covering, impervious lining for civil engineering works, road joints, crack sealing products, etc. . . .

It has been noticed particularly in accordance with the French patent No. 2 580 658 that it was possible to improve the rheological characteristics of these binders and so widen their range of use, by adding heavy oils of the naphtheno-aromatic type and also olefinically unsaturated synthetic elastomers with a molecular weight of greater thatn 100,000, acting as reaction catalysts for incorporating rubber into the bitumen.

The conventional production process of these binders consists of introducing different constituents into a mixer in order to intimately mix them so as to obtain an initial mixture at a temperature of the order of 200° C. and to maintain this temperature with agitation for a period of around 40 to 140 minutes.

According to this process an initial mixture is generally used containing around 80% bitumen, 15 to 16% rubber powder, 3% heavy oils and 0.5 to 1.5% catalyst.

In this way, at the end of the reaction, binders are obtained having a dynamic viscosity of the order of 1.200 to 1.400 Pa.s at 200° C., a ball and ring softening point (standard AFNOR NFT 66008) of the order of 65° to 80° C. and a penetration at 25° C. (standard AFNOR NFT 66 0040) of the order of 60 to 65 $10^{-4}$m.

These binders prove to be satisfactory in practice but strictly have to be used at the latest in the six hours after they have been produced, given that it has been established that their properties degrade relatively quickly.

If, by way of example, the changes over a period of time of the viscosity at 200° C. of a conventional binder of the type mentioned above are considered, as shown in FIG. 1 attached, it is established that there is a constant increase followed by a peak in this viscosity at the beginning of the reaction then, after about two hours, a stage where it stays constant for around two and a half hours at a value of around 1.200 Pa.s.

Then the viscosity falls in a more or less regular way, this drop being accompanied by a drop in the temperature of the ball and ring softening point, and in general, of all the qualities of the binder.

The impossibility thus identified of being able to store conventional binders for longer than a few hours constitutes an enormous constraint during production, given that a complete binder production unit has to be moved to the work site, i.e., heavy bulky material which is expensive to transport.

It is therefore clear that for reasons of cost such movement of the material can only be considered for extremely large work sites before large quantities of binder are used.

The result of the above is that despite their qualities it is possible to use conventional binders of the type mentioned above on small work sites, particularly regional work sites.

The aim of the present invention is to remedy this drawback, by offering a new process for producing a binder of the type mentioned above which has qualities similar to those of conventional binders, although having an substantially modified composition and which also has the advantage of being able to be kept for several days, without needing any attention keeping its well defined and stable properties, thus allowing the production of the binder to be centralised to a certain extent, then to be distributed according to the needs of the different work sites.

In order for such a process to be satisfactory as regards the results obtained being profitable, it is necessary for the storage temperature of the binder after production to be relatively low, (as a rule equal to the maximum of 160° C.) and for the viscosity of the mixture to be high enough at this temperature for it to be pumped, which means that the viscositiy must not exceed 1.000 Pa.s.

BRIEF DESCRIPTION OF THE DRAWINGS

FIGS. 1–5 graphically illustrate the effect on properties such as viscosity and penetration of conditions such as method of mixing, rubber powder and oil concentrations and elapse of time.

According to the invention, it has been suprisingly noticed that it has been possible to solve the problem posed by employing a process for the preparation of a bitumen and reclaimed rubber powder binder for surfacing roadways or the like having as an additive a heavy oil of the naphtheno-aromatic type and also an olefinically unsaturated synthetic elastomer with a molecular weight greater than 100,000, acting as a catalyst for incorporating rubber into the bitumen, characterised in that the different constituents of the binder are intimately mixed so as to obtain an initial mixture, then this mixture is bought to a temperature of between 175° and 185° C. this temperataure is maintained with agitation for around two hours and a final viscosity is obtained of the order of 0.600 to 0.650 Pa.s., then the temperature of the mixture is lowered by 15° to 20° achieving a viscosity roughly equal to 1.000 Pa.s. and the binder thus obtained is stored in a hot cabinet at this temperature in a hermetically sealed vessel without agitation for a period of up to 10 days without any substantial change in its properties being observed before being pumped and heated again to a temperature of between 175° and 185° C. with a view to its final use.

Figure 1:
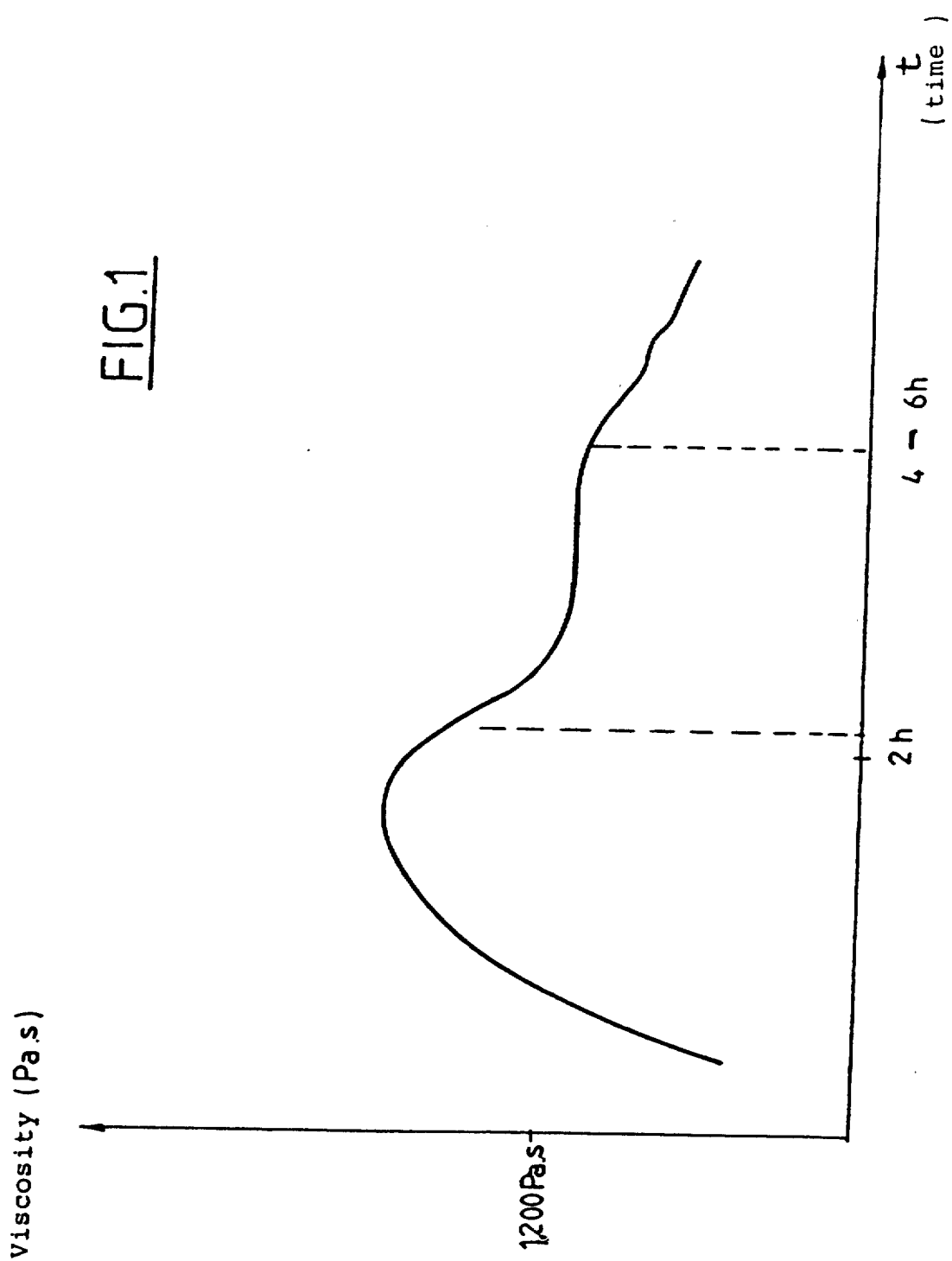
Figure 2:
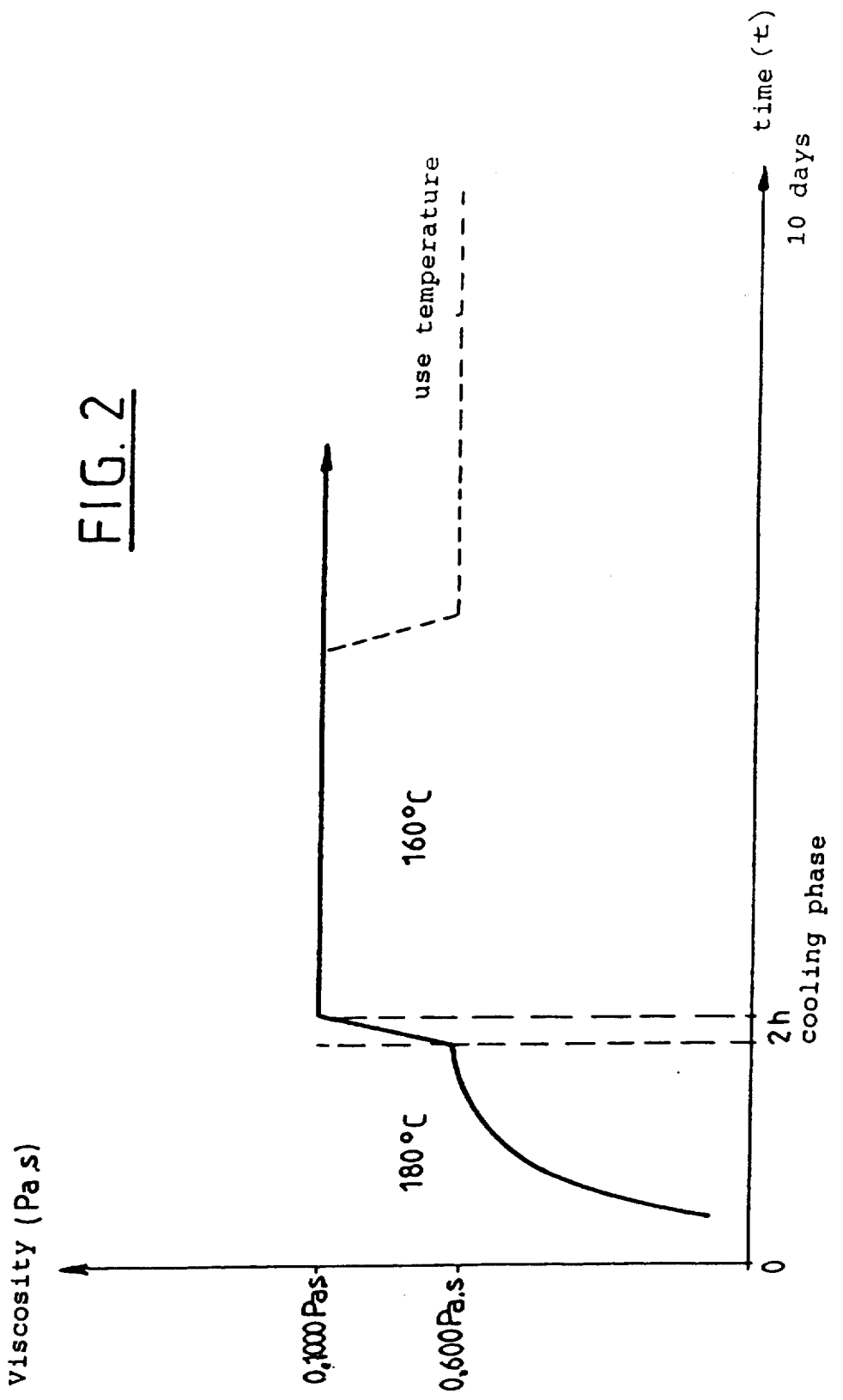

The process according to the invention therefore allows the curve showing the variations in the viscosity of a conventional rubber bitumen binder at 200° C. over a period of time shown in FIG. 1, to be replaced by a curve close to the theoretical curve shown in FIG. 2 which corresponds to the changes in the viscosity at 180° and 160° C., over a period of the time of a binder obtained by the process according to the invention, such as it is desired.

The left hand part of this curve corresponding to a time between 0 and two hours, represents the production phase which is effected at a temperature of 180° C.; at this temperature the viscosity increases until it becomes stable at a value close to 0.600 Pa.s. The curve situated between the two vertical dotted lines corresponds to the cooling phase between 180° and 160° C.; There is a rapid colling but not a hardening, at the end of which viscosity stabilises at around 1.000 Pa.s. a value which it may retain for a period of around 10 daysm this viscosity is likely at any moment to be reduced to around 0.600 Pa.s. by heating the product to 180° C., which corresponds to its temperature of use, as indicated by the dotted lines in the diagram.

In order that the process defined above is adapted to allow the production of a binder giving maximum satisfaction, it is necessary to modify a little the proportions of the different constituents of the initial mixture, relative to those of the conventional mixture mentioned above.

To this end, and according to a preferred characteristic of the invention, between 8 and 10% by weight of a rubber powder are employed in the initial mixture, comprising itself for 100 parts by weight, 20 to 80 parts of lorry type ground waste and 80 to 20 parts of car and/or motor-cycle type ground waste.

This reduction in the proportion of powder relative to the conventional mixture is dictated by the above mentioned need to reduce the viscosity of the binder; it is well known that a reduction in the quatity of rubber powder, automatically leads to a reduction in viscosity.

Figure 3:
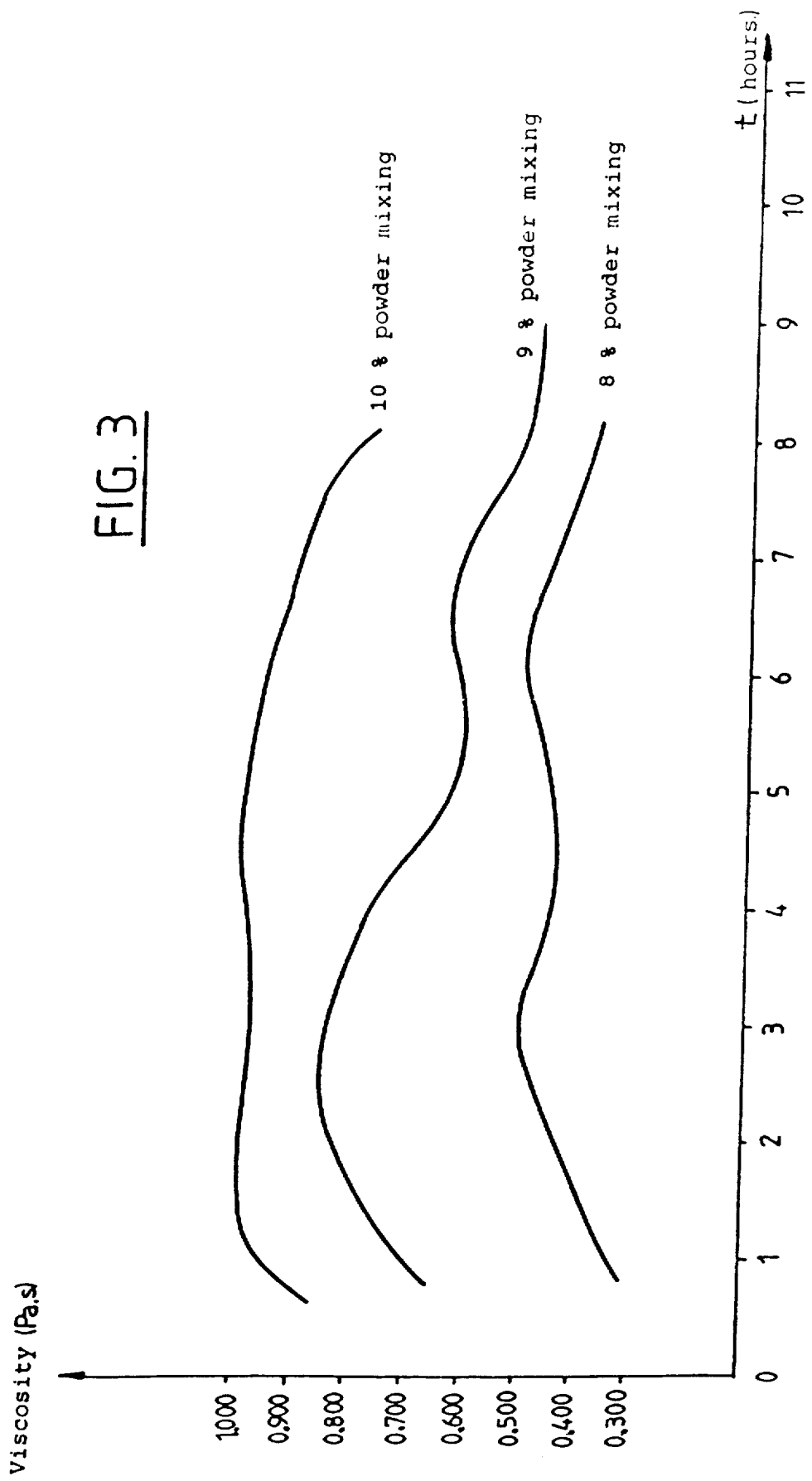

This characteristic is bought out by the curves shown in FIG. 3 which shows the effect of the rubber powder concentration of the initial mixture on the variations over a period of time of the viscosity of the binder obtained according to the invention at a temperature of 180° C. and in the case of initial mixtures containing 5% of heavl oil, 2% catalyst and respectively 8, 9 and 10% of rubber powder.

It is clear, judging from the curves, that in the case of a mixture of 10% of powder, viscosity stabilises at a value of close to 1.000 Pa.s. i.e., of the limit researched, whilst for the mixtures containing 8 and 9% powder, the corresponding values are respectively 0.550 and 0.850 Pa.s.

It is also interesting to note that the viscosity curves are flatter as the percentage of rubber powder increases; It is possible to observe, on the curve corresponding to a mixture containing 10% of powder, a period of 7 hours in which the viscosity hardly varies at all.

In the case of the example considered the curves shown in FIG. 3, penetration of the binder changes from 84 $10^{-4}$ meters for the mixture at 8% rubber powder to 77 for the mixture at 9% and 72 for the mixture at 10% rubber powder; Experience shows that the optimal value of penetration is around 60 to 70 $10^{-4}$ m.

This observation tends to guide the choice of users of the process according to the invention towards the initial mixtures containing around 10% rubber powder, all the more so because it has also been observed that resilience improves slightly as the quantity of powder increases.

Besides, and in a conventional way according to the invention, a powder is preferably employed containing both lorry tire ground waste and car and/or motorcycle tire ground waste; It is thus possible to combine the essential qualities of natural rubber (resistance to splitting, good adherence when mixed with bitumen) to those of synthetic rubber (outstanding control at low temperatures); it is, in effect, well known that lorry tires basically contain natural rubber consisting mainly of poly-isoprene, whereas light vehicle tires contain mainly synthetic rubber of the poly-butadiene type.

According to another characteristic of the invention, in the initial mixture 4 to 6% by weight of heavy oil of the naphtheno-aromatic type is employed.

Among the oils of this type which can be used satisfactorily, it is possible to quote by way of example, oil marketed by the company ESSO under the name "FLEXON 110" (registered trade mark) or any one of the equivalent products commercially available.

Figure 4:
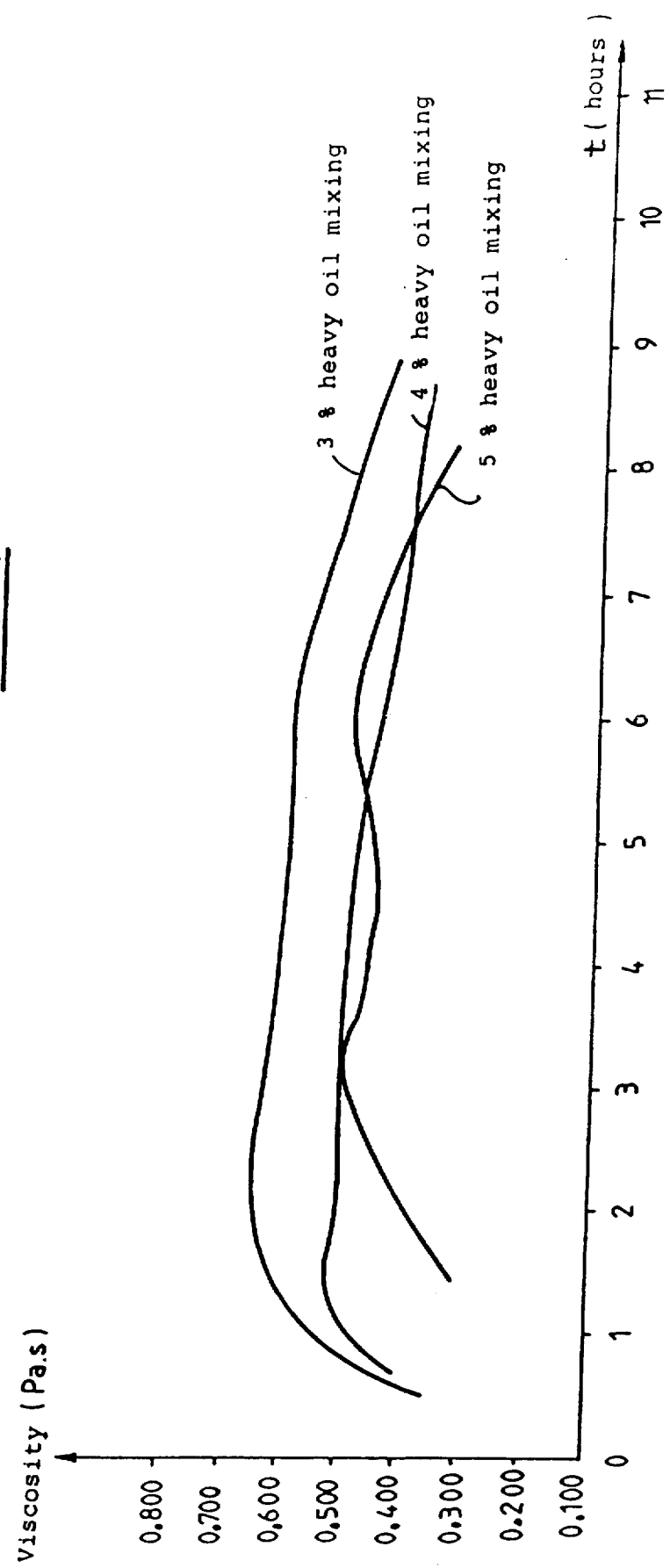

It has been proved that the percentage increase of heavy oil in the initial mixture reduces the viscosity in an almost regular way and that it is possible to achieve a reduction in viscosity of 60 to 100 $10^{-3}$ Pa.s. for a variation in the proportion of heavy oil near 1% the curves shown in FIG. 4 allow the effect to be proved in the case of a binder produced according to the invention, at a temperature of 180° C., from an initial mixture containing 8% rubber powder, 2% catalyst and respectively 3, 4 and 5% heavy oil.

According to the invention, it is therefore important to select a concentration of heavy oil greater that the concentration generally used in conventional binders. However experience has shown that it was always preferable to keep this concentration at a maximum value of 6% given that in the same way as the viscosity falls, the increase in the concentration of heavy oil can be harmful to the dynamic qualities of the binder obtained, given that it increases the penetration and lowers the resilience.

According to another characteristic of the invention, 2 to 3% by weight of catalyst is employed in the initial mixture.

In the conventional way this catalyst can be selected from ethylenically unsaturated polymers or copolymers which have already been recommended for a long time for incorporation into sulphur-vulcanised bitumen intended for road surfacings or similar products.

For example, it is possible to mention in a non-limiting way poly-isoprenes, poly-chloroprenes, poly-butadienes, ethylene-propylene, ethylene-vinyl acetate, butadiene-styrene polymers, terpolymers of ethylene, propylene and other copolymerisable dienes eg styrene-butadiene-styrene, styrene, styrene-isoprene-styrene etc.

It has been established that the increase in the catalyst proportions has had a beneficial effect on the viscosity of the binder.

According to another characteristic of the invention, around 10% by weight of the rubber powder, 6% by weight of heavy oil of the naphtheno-aromatic type and 2.5% by weight of cayalyst is used in the initial mixture, the rest being made up to 100% by a conventional bitumen.

This proportion in the initial mixture has in effect proved to give the best results.

The curve 1 shown in FIG. 5 shows the change over time in the ball and ring softening point and at 160° C. of a binder according to the invention having the above-mentioned composition.

After a slight variation at the beginning, it is possible to note a plateau lasting for at least 6 days which satisifies the desired aim.

This advantage becomes especially clear if the curve is compared with the curve II which corresponds to the development in time of the ball and ring softening point which can only be kept at a maximum for a few hours.

Given its viscosity, such a binder cannot be stored at a temperature lower than 200° C. as otherwise it would be impossible to handle it with the pumping means currently used at work sites.

The invention also relates to a binder for surfacing roadways or the like based on bitumen and reclaimed rubber powder and comprising as an additive a heavy oil of the naphtheno-aromatic type as well as an olefinically unsaturated synthetic elastomer of molecular weight greater than 100 000 being used as a catalyst for incorporating rubber into the bitumen, this binder being obtained by employing the above mentioned process.

I claim:

1. A process for preparing a bitumen and reclaimed rubber powder-based binder for surfacing roadways comprising:
   (a) forming an initial mixture comprising 81% to 86% by weight of bitumen, 8% to 10% by weight of a reclaimed rubber powder, wherein said powder comprises 20% to 80% ground lorry tires which predominantly comprise a natural rubber and 80% to 20% ground light vehicles tires which predominantly comprise synthetic rubber, 4% to 6% by weight of a naphthenol-aromatic-type heavy oil, and 2% to 3% by weight of a catalyst for incorporating said rubber powder into said bitumen, wherein said catalyst comprises ethylenically unsaturated polymers which can be incorporated into sulfur-vulcanized bitumen intended for surfacing road-ways, said weight percentages being based on the total weight of said initial mixture;
   (b) heating said initial mixture to a temperature of between 175° C. and 185° C., and maintaining said temperature with agitation until the viscosity of said mixture reaches from about 0.600 to about 0.650 Pa.s.; and
   (c) reducing the temperature of said mixture by 15° to 20° C.

2. A process according to claim 1 wherein said catalyst comprises an olefinically unsaturated synthetic elastomer having a molecular weight greater than 100,000.

3. A process according to claim 1 wherein said catalyst comprises at least one polymer selected from the group consisting of poly-isoprenes, poly-chloroprenes, poly-butadienes, ethylene-propylene, ethylene-vinyl acetate, butadiene-styrene, terpolymers or ethylene, propylene and other copolymerizable dienes.

4. A process according to claim 1 wherein said catalyst comprises at least on copolymerizable diene selected from the group consisting of styrene-butadiene-styrene and styrene-isoprene-styrene.

5. A process according to claim 1 wherein said initial mixture comprises, all by weight, about 10% rubber powder, about 6% naphthenol-aromatic-type heavy oil, and about 2.5% catalyst, the balance of the initial mixture comprising bitumen.

6. A bitumen and reclaimed rubber binder prepared according to the process of claim 1.

7. A bitumen and reclaimed rubber powder binder prepared according to the process of claim 1, wherein said ground light vehicle tires are selected from the group consisting of ground automobile tires and ground motorcycle tires.

8. A bitumen and reclaimed rubber powder binder prepared according to the process of claim 2.

9. A bitumen and reclaimed rubber powder binder prepared according to the process of claim 3.

10. A bitumen and reclaimed rubber powder binder prepared according to the process of claim 4.

11. A bitumen and reclaimed rubber powder binder prepared according to the process of claim 5.

12. A process for preparing a bitumen and reclaimed rubber powder-based binder for surfacing roadways comprising:
   (a) forming an initial mixture comprising 81% to 86% by weight of bitumen, 8% to 10% by weight of a reclaimed rubber powder, wherein said powder comprises 20% to 80% ground lorry tires predominantly comprising a natural rubber and 80% to 20% ground small vehicle tires predominantly comprising a synthetic rubber, 4% to 6% by weight of a naphthenol-aromatic-type heavy oil, and 2% to 3% by weight of a catalyst for incorporating said rubber powder into said bitumen, wherein said catalyst comprises ethylenically unsaturatd polymers which can be incorporated into sulfur-vulcanized bitumen intended for surfacing roadways, said weight percentages being based on the total weight of said initial mixture;
   (b) heating said initial mixture to a temperature between 175° C. and 185° C. for a time period of at least about two hours; and
   (c) reducing the temperature of said mixture by 15° to 20° C., wherein said reduced temperature does not exceed about 160° C.

13. A process according to claim 12 wherein after step (b) and before step (c) the viscosity of said mixture is in the range from about 0.500 to about 0.850 Pa.s.

14. A process according to claim 11 wherein after step (b) and before step (c) the viscosity of said mixture is in the range from about 0.600 to about 0.650 Pa.s.

15. A process according to claim 11 wherein after step (c), said process further comprises the step of:
   (d) maintaining said mixture at said reduced temperature for a period of time greater than about 6 hours.

16. A process according to claim 12 wherein after step (c), said process further comprises the step of:
   (d) maintaining said mixture at said reduced temperataure for a period of time less than about 10 days.

17. A process according to claim 15 wherein after step (d), said process further comprises the step of:
   (e) reheating said mixture to a temperature between 175° C. and 185° C.

18. A process according to claim 12 wherein said initial mixture comprises, all by weight, about 10% rubber powder, about 6% naphthenol-aromatic-type heavy oil, about 2.5% catalyst, and about 81.5% bitumen.

19. A bitumen and reclaimed rubber powder binder prepared according to the process of claim 12.

20. A bitumen and reclaimed rubber powder binder prepared according to the process of claim 12.

21. A bitumen and reclaimed rubber powder binder prepared according to the process of claim 12.

22. A bitumen and reclaimed rubber powder binder prepared according to the process of claim 13.

23. A bitumen and reclaimed rubber powder binder prepared according to the process of claim 14.

24. A bitumen and reclaimed rubber powder binder prepared according to the process of claim 15.

25. A bitumen and reclaimed rubber powder binder prepared according to the process of claim 16.

26. A bitumen and reclaimed rubber powder binder prepared according to the process of claim 17.

* * * * *